(12) United States Patent
Kim

(10) Patent No.: US 9,627,663 B2
(45) Date of Patent: Apr. 18, 2017

(54) RECHARGEABLE BATTERY PACK INCLUDING PACK COVER

(71) Applicant: SAMSUNG SDI CO., LTD., Yongin-si, Gyeonggi-do (KR)

(72) Inventor: Hyung-Ho Kim, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 262 days.

(21) Appl. No.: 14/091,883

(22) Filed: Nov. 27, 2013

(65) Prior Publication Data

US 2014/0322566 A1 Oct. 30, 2014

Related U.S. Application Data

(60) Provisional application No. 61/815,927, filed on Apr. 25, 2013.

(51) Int. Cl.
*H01M 2/04* (2006.01)
*H01M 2/10* (2006.01)

(52) U.S. Cl.
CPC .................. *H01M 2/1016* (2013.01)

(58) Field of Classification Search
None
See application file for complete search history.

(56) References Cited

U.S. PATENT DOCUMENTS

| 4,207,387 A * | 6/1980 | Jutte | H01M 2/1252 429/88 |
| 2004/0086778 A1* | 5/2004 | Nakano | H01M 2/1252 429/82 |
| 2006/0269808 A1* | 11/2006 | Merlo | H01M 8/021 429/122 |
| 2011/0206957 A1* | 8/2011 | Byun | H01M 2/043 429/56 |

FOREIGN PATENT DOCUMENTS

| JP | 2004-172099 | 6/2004 |
| JP | 2009-043675 A | 2/2009 |
| JP | 2012-221837 A | 11/2012 |
| KR | 1998-048030 | 9/1998 |
| KR | 10-2009-0063720 | 6/2009 |
| KR | 10-2012-0119407 A | 10/2012 |
| KR | 1020120119407 | * 10/2012 |

OTHER PUBLICATIONS

Korean Notice of Allowance dated Oct. 28, 2015 in Corresponding Korean Patent Application No. 10-2014-0017287.

* cited by examiner

*Primary Examiner* — Daniel Gatewood
(74) *Attorney, Agent, or Firm* — Lee & Morse P.C.

(57) ABSTRACT

A battery pack includes at least one unit cell with a top end, the unit cell including a vent hole, and a pack cover over the top end of the unit cell. The pack cover includes a discharge part having a bottom member that is sloped with respect to the top end of the unit cell. The bottom member of the pack cover including an aperture corresponding to the vent hole of the unit cell.

20 Claims, 12 Drawing Sheets

RECHARGEABLE BATTERY PACK INCLUDING PACK COVER

CROSS-REFERENCE TO RELATED APPLICATION

The present application claims priority under 35 U.S.C. §119 to U.S. Provisional Application No. 61/815,927, filed on Apr. 25, 2013, and entitled: "Rechargeable Battery Pack Including Pack Cover," which is incorporated herein by reference in its entirety.

BACKGROUND

1. Field

Embodiments relate to a rechargeable battery pack including a pack cover.

2. Description of the Related Art

Unlike a primary battery, a rechargeable battery is a battery which repeatedly performs charging and discharging. A small-capacity rechargeable battery is used for small portable electronic devices such as mobile phones, notebook computers, camcorders, and the like, while a large-capacity rechargeable battery is used as a motor-driving power source for a hybrid vehicle, and the like.

The rechargeable battery may be used as a unit cell in a small electronic device, or as a pack in which a plurality of unit cells are electrically connected to each other for driving a motor. The rechargeable battery pack may be formed by connecting electrode terminals of unit cells to each other through bus bars.

SUMMARY

Embodiments are directed to a battery pack, including at least one unit cell with a top end, the unit cell including a vent hole, and a pack cover over the top end of the unit cell. The pack cover includes a discharge part having a bottom member that is sloped with respect to the top end of the unit cell, the bottom member of the pack cover including an aperture corresponding to the vent hole of the unit cell.

The vent hole of the unit cell may be sealed by a vent plate. The vent plate may be openable in response to a predetermined internal pressure being exceeded in the unit cell.

The vent hole and vent plate may be at the top end of the unit cell.

The bottom member may be spaced from the vent hole.

The aperture may provide fluid communication between the vent hole and the discharge part.

The pack cover may be spaced apart from the top end of the unit cell.

The at least one unit cell may include a plurality of unit cells and the aperture includes a plurality of apertures, each of the apertures corresponding to the vent hole of a respective one of the unit cells.

The bottom member may be inclined to have a greatest distance from the top end of one of the unit cells at a center of the plurality of unit cells in a first direction.

The pack cover may further include a flat plate covering the discharge part and a sidewall extending in a first direction, the sidewall connecting the flat plate and the bottom member.

The discharge part may further include a cell barrier member extending from the bottom member and extending in the first direction between the apertures and the sidewall, the cell barrier member being spaced apart from the flat plate such that a fluid flow path is between the cell barrier member and the sidewall, the fluid flow path being in fluid communication with the apertures.

The battery pack may further include a housing that receives the plurality of unit cells. The pack cover may further include a lateral plate at respective ends of the pack cover in the first direction, the lateral plate being spaced apart from the housing by a gap.

The bottom member may extend into the gap such that a fluid exit path is provided in the gap between the bottom member and the lateral plate.

Each of the apertures may be partially surrounded by a lip in an upper portion at a lateral side of the apertures in a sloping direction, the lip surrounding at least half of a circumference of each aperture.

The pack cover may further include an upper member connected to an inner surface of the flat plate and extending in a direction toward the bottom member.

The upper member may be positioned to correspond in a vertical direction to a space between adjacent apertures.

The upper member may include a bottom end.

The battery pack may further include a housing that receives the plurality of unit cells. The housing may be connected to the pack cover by coupling members.

The coupling members may include coupling protrusions that engage the housing and the pack cover and separation parts that maintain a separation between the pack cover and the housing.

The pack cover and the housing may include coupling holes that receive the coupling protrusions.

The coupling holes may be at corners of the housing and the pack cover.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
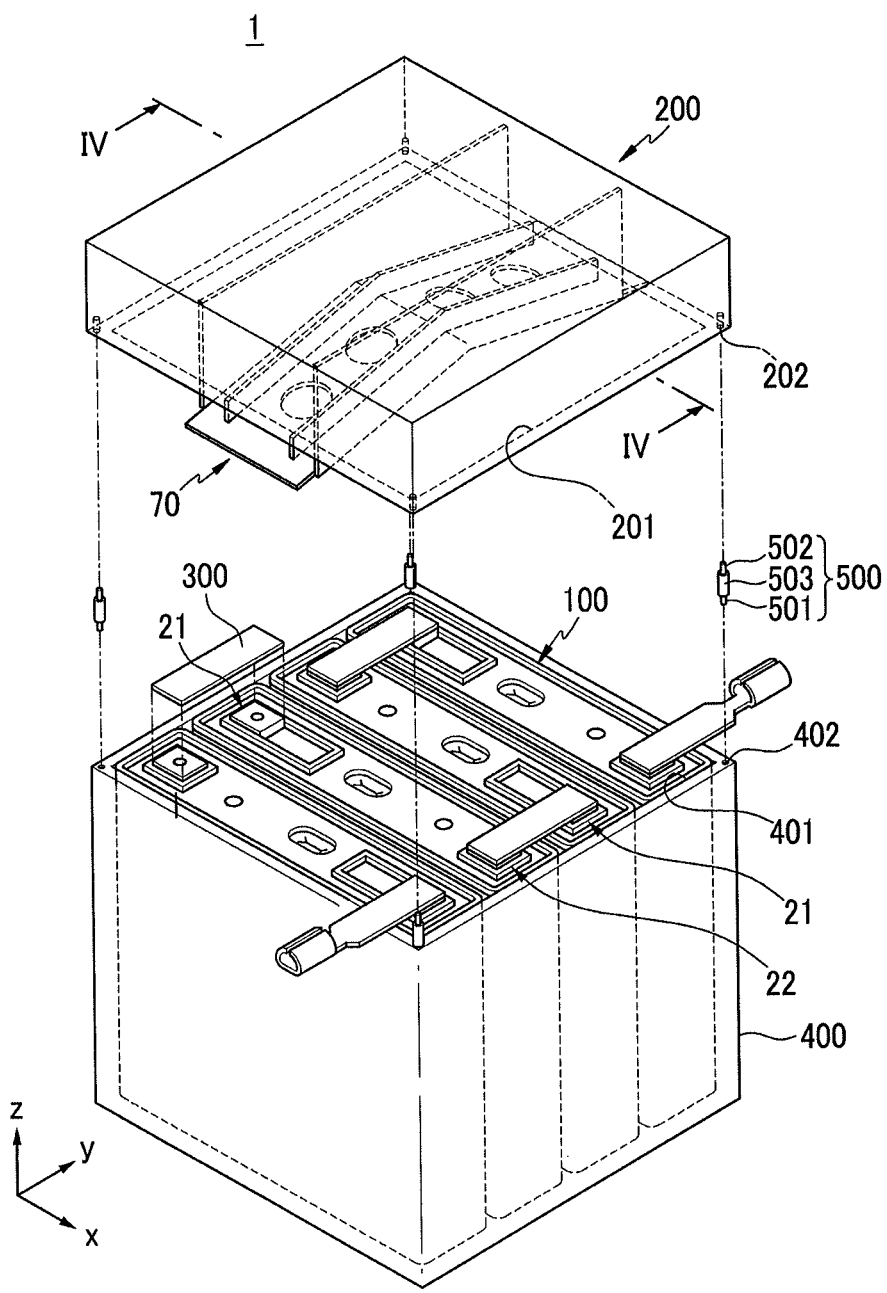
FIG. 1 illustrates an exploded perspective view depicting a rechargeable battery pack according to an exemplary embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

FIG. 1 illustrates an exploded perspective view depicting a rechargeable battery pack according to an exemplary embodiment. Referring to FIG. 1, the rechargeable battery pack 1 includes at least one unit cell 100, the unit cell 100 being a rechargeable battery, and a pack cover 200 covering the unit cell 100.

The cover 200 may include a discharge part 70 corresponding to a cap plate 20 side of the unit cell 100. The discharge part 70 may discharge gas and an erupting material that may erupt from the unit cell 100 to the outside.

As shown in FIG. 1, when a plurality of unit cells 100 are present, the rechargeable battery pack 1 may be configured by connecting the first and second electrodes 21 and 22 of unit cells 100 to each other by bus bars 300.

The rechargeable battery pack 1 may further include a housing 400 receiving the unit cells 100. The housing 400 may include a first opening 401 to expose cap plate 20 sides of the received unit cells 100. The pack cover 200 may include a second opening 201 in an opposing relationship to the first opening of the housing 400.

Figure 2:
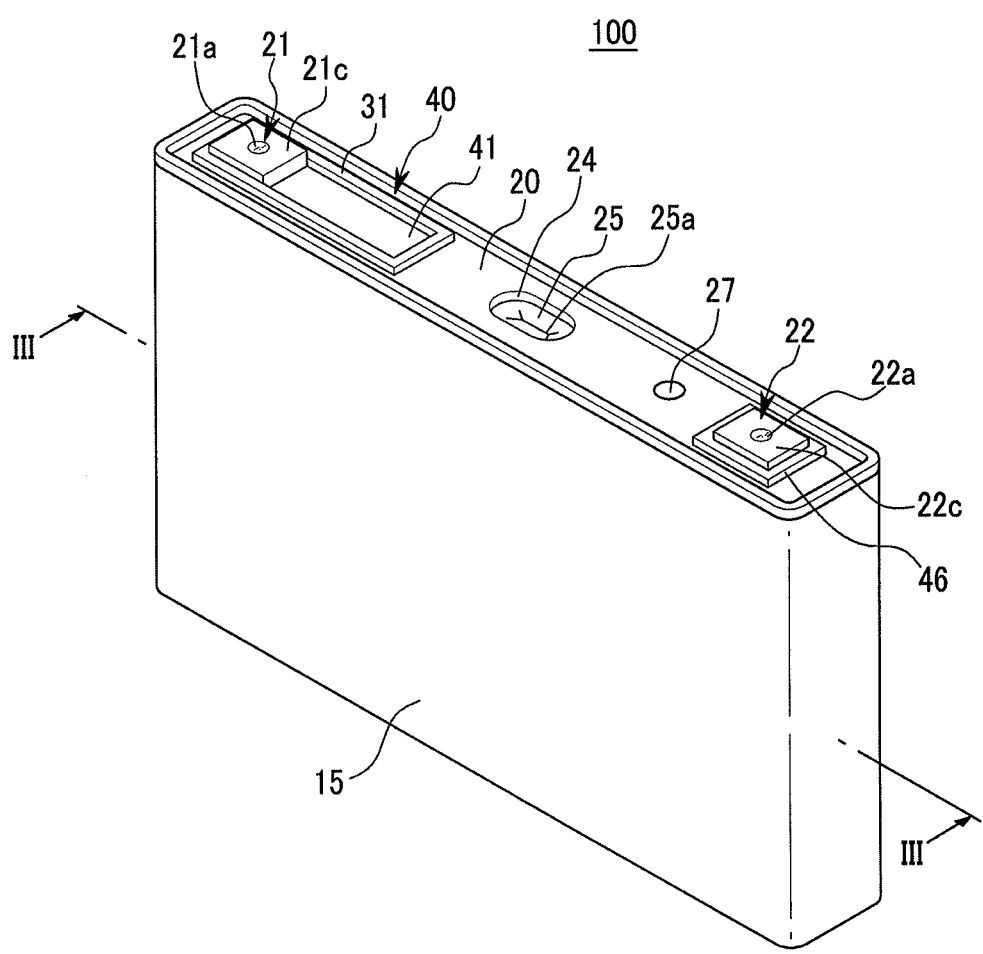
FIG. 2 illustrates a perspective view depicting a unit cell of the rechargeable battery pack illustrated in FIG. 1.
Figure 3:
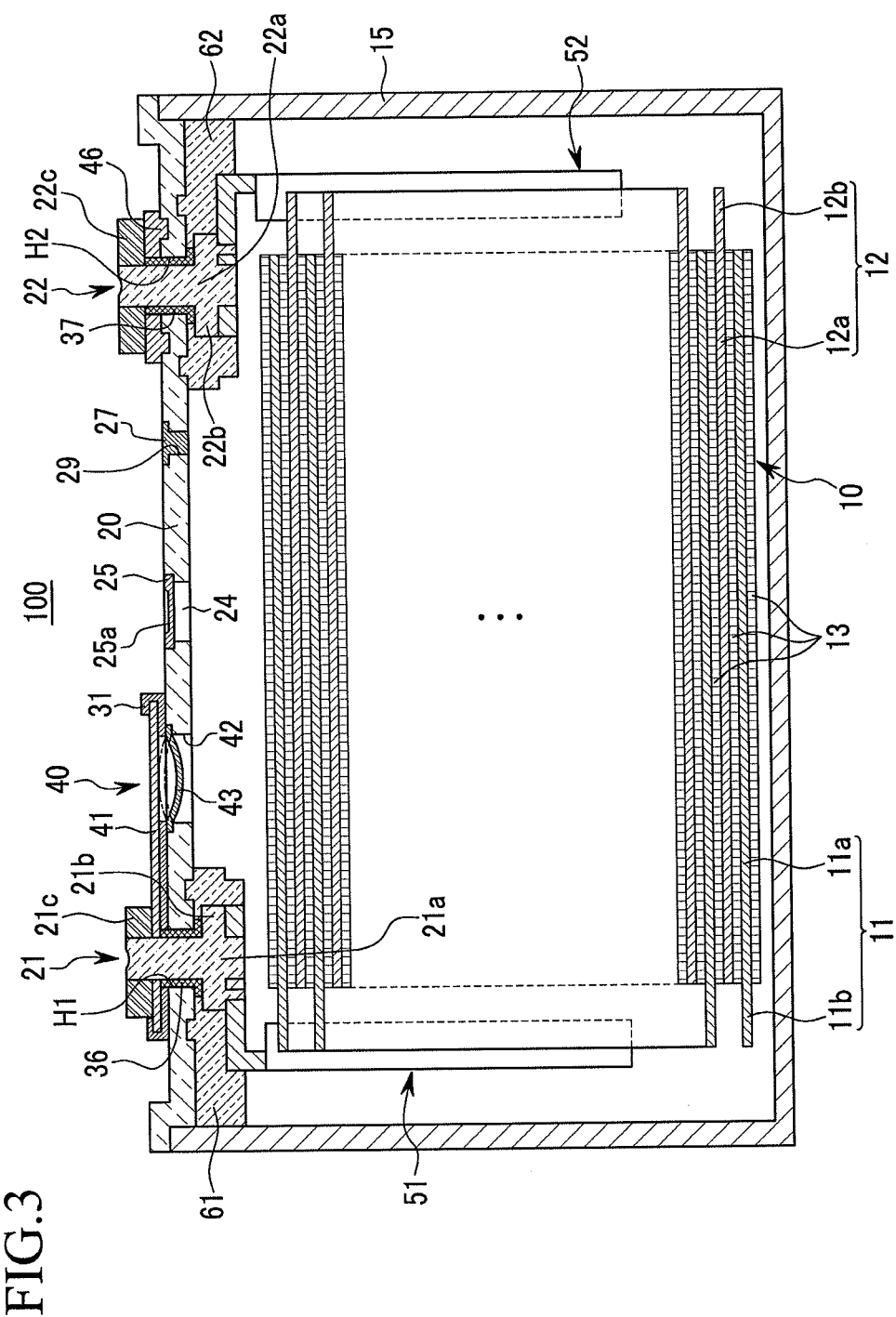
FIG. 3 illustrates a sectional view taken along line III-III of FIG. 2.

FIG. 2 illustrates a perspective view depicting one of the unit cells illustrated in FIG. 1. FIG. 3 is a sectional view taken along line III-III of FIG. 2. Referring to FIG. 2 and FIG. 3, the unit cell 100 may include an electrode assembly 10 charging and discharging an electric current, a case 15 receiving the electrode assembly 10, a cap plate 20 coupled with an opening of the case 15, a first electrode terminal (hereinafter referred to as "negative terminal") 21 and a second electrode terminal (hereinafter referred to as "positive terminal") 22 installed in the cap plate 20, and an external short-circuit part provided at the negative terminal 21 side.

For example, the electrode assembly 10 may be configured by disposing a first electrode (hereinafter referred to as "negative electrode") 11 and a second electrode (hereinafter referred to as "positive electrode") 12 at both surfaces of a separator 13, which is an insulator, and winding the negative electrode 11, the separator 13, and the positive electrode 12 in a jelly-roll configuration.

The negative electrode 11 and the positive electrode 12 may include coating regions 11a and 12a where a current collector of a metal plate is coated with an active material and uncoated regions 11b and 12b having an exposed current collector that is not coated with the active material, respectively.

An uncoated region 11b of the negative electrode 11 may be formed at one end of the negative electrode 11 along a spirally wound negative electrode 11. The uncoated region 12b of the positive electrode 12 may be formed at one end of the positive electrode 12 along a spirally wound positive electrode 12. The uncoated regions 11b and 12b may be disposed at both ends of the electrode assembly 10, respectively.

For example, the case 15 may be configured as a case having a substantially cubic shape to provide a space that receives the electrode assembly 10 and an electrolyte solution. An opening connecting an inner space to the outside may be formed on one surface of the cuboid. The opening enables the electrode assembly 10 to be inserted into the case 15.

The cap plate 20 may be installed at the opening of the case 15 to close and seal the case 15. For example, the case 15 and the cap plate 20 may be formed of aluminum. The case 15 and the cap plate 20 may be welded to each other.

Further, the cap plate 20 may include an electrolyte injection opening 29, a vent hole 24, and terminal holes H1 and H2. After the cap plate 20 is coupled with the case 15, the electrolyte solution may be injected into the case 15 through the electrolyte injection opening 29. After the electrolyte solution is injected, the electrolyte injection opening 29 may be sealed by a sealing stopper 27.

The vent hole 24 may be closed and sealed by a vent plate 25. If the internal pressure of the unit cell 100 increases to become equal to or greater than a predetermined pressure, the vent plate 25 is cut to open the vent hole 24 so that internal pressure of the unit cell 100 may be discharged. The vent plate 25 includes a notch 25a to induce the cutting.

The negative terminal 21 and the positive terminal 22 may be installed in the terminal holes H1 and H2 of the cap plate 20 and may be electrically connected to the electrode assembly 10. The negative terminal 21 may be electrically connected to the negative electrode 11 of the electrode assembly 10, and the positive terminal 22 may be electrically connected to the positive electrode 12 of the electrode assembly 10. Accordingly, the electrode assembly 10 may connected to an outside of the case through the negative terminal 21 and the positive terminal 22.

The negative terminal 21 and the positive terminal 22 may have the same structure at an inner side of the cap plate 20 and may have different structures at an outer side of the cap plate 20. Accordingly, the similar structures may be described together and the different structures may be separately described.

The negative and positive terminals 21 and 22 may include rivet terminals 21a and 22a installed in terminal holes H1 and H2 of the cap plate 20, flanges 21b and 22b integrally and widely formed in the rivet terminals 21a and 22a in an inner side of the cap plate 20, and plate terminals 21c and 22c connected to the rivet terminals 21a and 22a, and which are disposed in the outer side of the cap plate 20 through riveting or welding.

Negative and positive gaskets 36 and 37 may be installed between the rivet terminals 21a and 22a of the negative and positive terminals 21 and 22 and inner surfaces of the terminal holes H1 and H2 of the cap plate 20, may seal a space between the rivet terminals 21a and 22a of the negative and positive terminals 21 and 22 and the cap plate 20, and may electrically insulate the rivet terminals 21a and 22a of the negative and positive terminals 21 and 22 from the cap plate 20.

The negative and positive gaskets 36 and 37 may extend between the flanges 21b and 22b and an inner surface of the cap plate 20, may further seal the space between the flange 21b and 22b and the cap plate 20, and may electrically insulate the flange 21b and 22b from the cap plate 20. The negative and positive gaskets 36 and 37 may prevent the electrolyte solution from being leaked through the terminal holes H1 and H2 after the negative and positive terminals 21 and 22 are installed in the cap plate 20.

The negative and positive electrode lead tabs 51 and 52 may electrically connect the negative and positive terminals 21 and 22 to the negative and positive electrodes 11 and 12 of the electrode assembly 10, respectively. The negative and positive electrode lead tabs 51 and 52 may be coupled with bottom ends of the rivet terminals 21a and 22a and may caulk the bottom ends of the rivet terminals 21a and 22a, such that the positive electrode lead tab 51 and 52 are connected to bottom ends of the rivet terminals 21a and 22a while being supported by the flanges 21b and 22b.

Negative and positive insulating members 61 and 62 may be installed between the negative and positive electrode lead tab 51 and 52 and the cap plate 20 to electrically insulate the negative and positive electrode lead tab 51 and 52 from the cap plate 20. Respective one sides of the negative and positive insulation members 61 and 62 may be coupled with the cap plate 20, and respective other sides thereof may surround the negative and positive electrode lead tabs 51 and 52, the rivet terminals 21a and 22a, and the flanges 21b and 22b so that the connection structure thereof is stabilized.

The external short part 40 is described below in connection with the plate terminal 21c of the negative terminal 21, and the top plate 46 is described in connection with the plate terminal 22c of the positive electrode terminal 22.

The external short-circuit part 40 of the negative terminal 21 side includes a short-circuit tab 41 and a short-circuit member 43 which are spaced apart or shorted according to internal pressure. The short-circuit tab 41 is electrically connected to the rivet terminal 21a of the negative terminal 21 and is disposed at an outer side of the cap plate 20 while being interposed the insulation member 31 therebetween.

The insulation member 31 is installed between the short-circuit tab 41 and the cap plate 20 to electrically insulate the short-circuit tab 41 from the cap plate 20. The cap plate 20 may maintain a state of being electrically insulated from the negative terminal 21.

The short-circuit tab 41 and the plate terminal 21c may be coupled with a upper end of the rivet terminal 21a, and may caulk the upper end of the rivet terminal 21a, so that the short-circuit tab 41 and the plate terminal 21c are coupled with a upper end of the rivet terminal 21a. Accordingly, the short-circuit tab 41 and the plate terminal 21c may be fixed to the cap plate 20 while being interposed the insulation member 31 therebetween.

The short-circuit member 43 may be installed in the short-circuit hole 42, which is formed in the cap plate 20. The short-circuit tab 41 may be connected to the negative terminal 21 and may extend along an outer side of the short-circuit member 43. Accordingly, the short-circuit tab 41 and the short-circuit member 43 may correspond to the short-circuit hole 42 and may face each other to maintain a spaced state (solid line state). When internal pressure of the unit cell 100 is increased, a short-circuit state (as shown by the imaginary line in FIG. 3) may be formed by inversion of the short-circuit member 43.

The top plate 46 of the positive terminal 22 side may electrically connect the plate terminal 22c of the positive terminal 22 to the cap plate 20. For example, the top plate 46 may be interposed between the plate terminal 22c and the cap plate 20, and an electrical connection may be formed through the rivet terminal 22a.

Accordingly, the top plate 46 and the plate terminal 22c may be coupled with an upper end of the rivet terminal 22a to caulk the upper end of the rivet terminal 22a, so that the top plate 46 and the plate terminal 22c are coupled with the upper end of the rivet terminal 22a. The plate terminal 22c may be installed at an outer side the cap plate 20 with the top plate 46 being interposed therebetween.

The positive gasket 37 may extends between the rivet terminal 22a and the plate 46. The positive gasket 37 may prevents the rivet terminal 22a from being directly connected to the top plate 46. Instead, the rivet terminal 22a is electrically connected to the top plate 46 through the plate terminal 22c.

Figure 4:
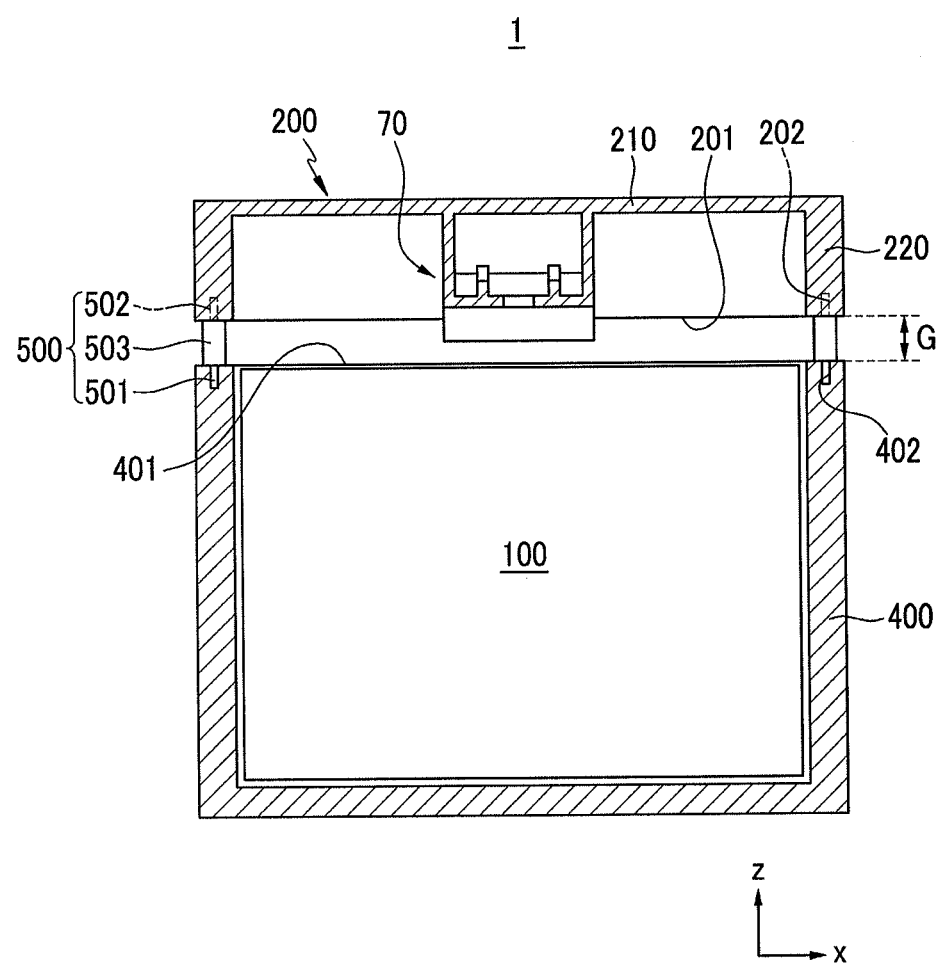
FIG. 4 illustrates a sectional view taken along line IV-IV of FIG. 1.

FIG. 4 illustrates a sectional view taken along line IV-IV of FIG. 1. Referring to FIG. 4, a pack cover 200 may be installed at the first opening 401 side of the housing 400 by a first coupling member 500. A first coupling hole 402 may be formed in the housing 400 corresponding to the first coupling member 500, and a second coupling hole 202 may be formed in the pack cover 200 corresponding to the first coupling member 500.

The first coupling member 500 may include a first coupling protrusion 501 and a second coupling protrusion 502 coupled with the first coupling hole 402 and the second coupling hole 202, and may include a separation part 503 between the first and second coupling protrusions 501 and 502.

The separation part 503 may be formed to have the size greater than diameters of the first coupling hole 402 and the second coupling hole. The first coupling protrusion 501 may be press-fit into the first coupling hole 402 of the housing 400, and the second coupling protrusion 502 may be press-fit into the second coupling hole 202, such that the pack cover 200 is coupled with the housing 400 with the pack cover 200 and the housing 400 being spaced apart from each other.

The first coupling hole 402 may be formed at four corners of the housing 400, the second coupling hole 202 may be formed at corresponding four corners of the pack cover 200. Accordingly, the pack cover 200 may be stably fixed and installed on the housing 400.

The pack cover 200 may include a flat plate 210 and a lateral plate 220. The flat plate 210 may be formed to be parallel with the cap plate 20 at an opposite side of the second opening 201. The lateral plate 220 forming the second opening 201 may be formed to be perpendicular to the flat plate 210.

Due to the spacing provided by the first coupling member 500, the first opening 401 of the housing 400 and the second opening 201 of the pack cover 200 may form a gap G spaced in a direction (z axis direction) crossing the cap plate 20. The size of the gap G formed between the lateral plate 220 and an upper end of the housing 400 may be equal to a length of the separation part 503 of the first coupling member 500.

Figure 5:
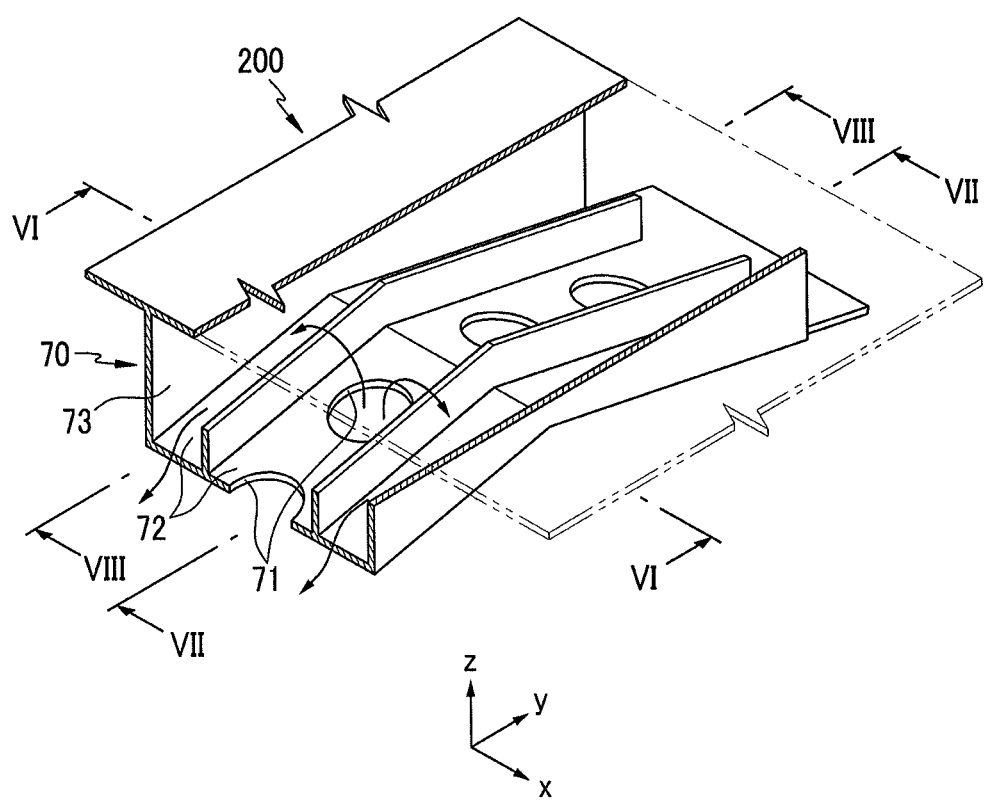
FIG. 5 illustrates a partially cutaway perspective view depicting a pack cover shown in FIG. 1.
Figure 6:
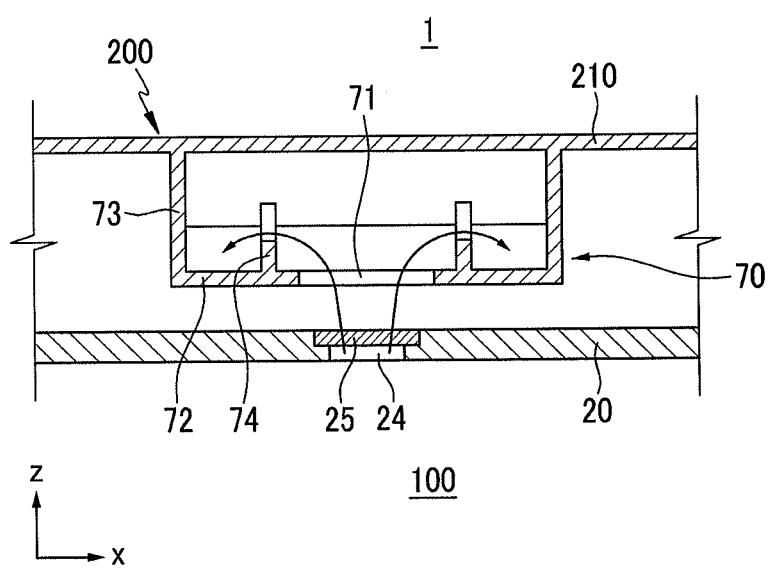
FIG. 6 illustrates a sectional view taken along line VI-VI of FIG. 1.

FIG. 5 illustrates a partially cutaway perspective view illustrating the pack cover shown in FIG. 1, and FIG. 6 is a sectional view taken along line VI-VI of FIG. 1. Referring to FIGS. 1, 5, and 6, a discharge part 70 may be disposed in an upper portion of the unit cell 100 inside the pack cover 200 to form an outlet 71 corresponding to the cap plate 20 side, allowing gas and an erupting material that may erupt from the cap plate 20 side of the unit cell 100 to be discharged outwardly from the rechargeable battery pack 1.

The discharge part 70 may be inclined with respect to one side of at least the unit cell 100 inside the pack cover 200, thereby discharging the gas and the erupting material to the outside of the rechargeable battery pack 1. According to an exemplary embodiment, the discharge part 70 may have a highest height at a center, and may have an inclined structure becoming gradually lower from the center to both sides (y axis direction) of the unit cell 100, thereby inducing the erupted gas and the erupting material to travel in directions away from both sides of the unit cell 100.

For example, the discharge part 70 may include a bottom member 72 that inclines upwardly with respect to the cap plate 20 and in which an outlet 71 is formed, a sidewall member 73 connecting both sides of the bottom member 72 (both sides of x axis direction) to an inner surface of the pack cover 200, and a cell barrier member 74 protruding from the bottom member 72 at an outer side of the outlet 71.

However, the present exemplary embodiment is not limited thereto. The discharge part 70 may only include the bottom member 72 that inclines upwardly with respect to the cap plate 20 and is fixed to the housing 400 and in which an outlet 71 is formed. And also, the pack cover 200 may be fixed to the housing to cover the bottom member 72.

The bottom member 72, the sidewall member 73, and the cell barrier member 74 may extend in a direction (y axis direction) in which unit cells 100 are disposed. The cell barrier member 74 may extend in a y axis direction between the outlet 71 and the sidewall member 73. Accordingly, a discharge material passing through the outlet 71 together with the gas may be discharged toward both sides along the bottom member 72 between the cell barrier member 74 and the sidewall member 73.

Figure 7:
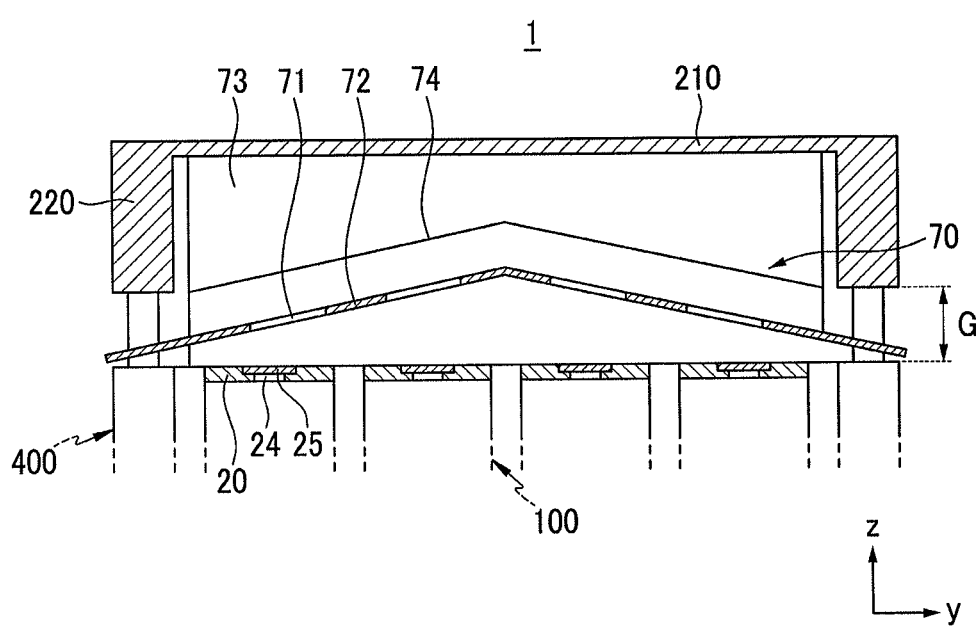
FIG. 7 illustrates a sectional view taken along line VII-VII of FIG. 5.
Figure 8:
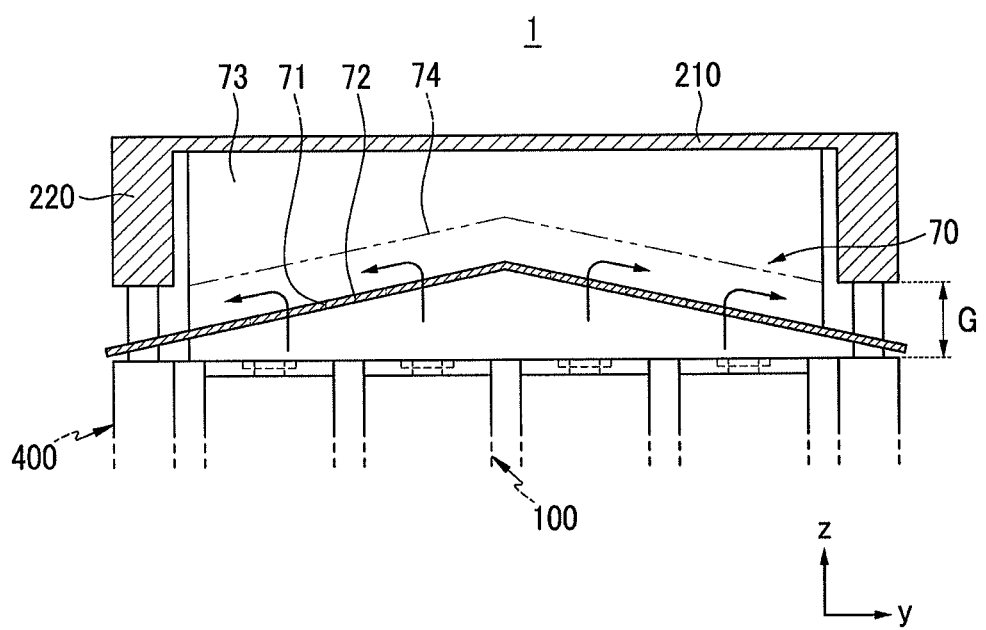
FIG. 8 illustrates a sectional view taken along line VIII-VIII of FIG. 5.

FIG. 7 illustrates a sectional view taken along line VII-VII of FIG. 5, and FIG. 8 is a sectional view taken along line VIII-VIII of FIG. 5. Referring to FIGS. 7 and 8, an end of the discharge part 70 may extend outward of the pack cover 200 and the housing 400 through the gap G formed between the pack cover 200 and the housing 400.

At least one end of the bottom member 72 may be drawn outward of the housing 400. Accordingly, the erupting material passing through the outlet 71 may be discharged outwardly of the housing 400 through the discharge part 70 and the bottom member 72.

The outlet 71 of the bottom member 72 may be formed to correspond to a vent hole 24 of the cap plate 20. Accordingly, if the vent plate 25 is cut such that the vent hole 24 opens, erupting material that erupts from the unit cell 100 together with the gas may pass through the cell barrier member 74 via the vent hole 24 and the outlet 71 and may discharged outwardly of the housing 400 through a bottom member 72 between the cell barrier member 74 and the sidewall member 73.

In the rechargeable battery pack 1 according to this exemplary embodiment, through operation (short-circuit) of the external short-circuit part 40 and an operation (cut) of the vent plate 25, gas that may erupt out of the cap plate 20 from inside unit cell 100 may be discharged outwardly through the discharge part 70.

A discharge material (e.g., electrolyte solution) that may be discharged together with the gas may be induced to the bottom member 72 through the outlet 71 and may be discharged to the gap G. Accordingly, secondary pollution of the unit cell 100 due to discharging of the discharge material may be reduced or prevented.

Hereinafter, another exemplary embodiment will be described. A description of elements that are the same as those of the previous exemplary embodiment will not be repeated, but only different elements will be described.

Figure 9:
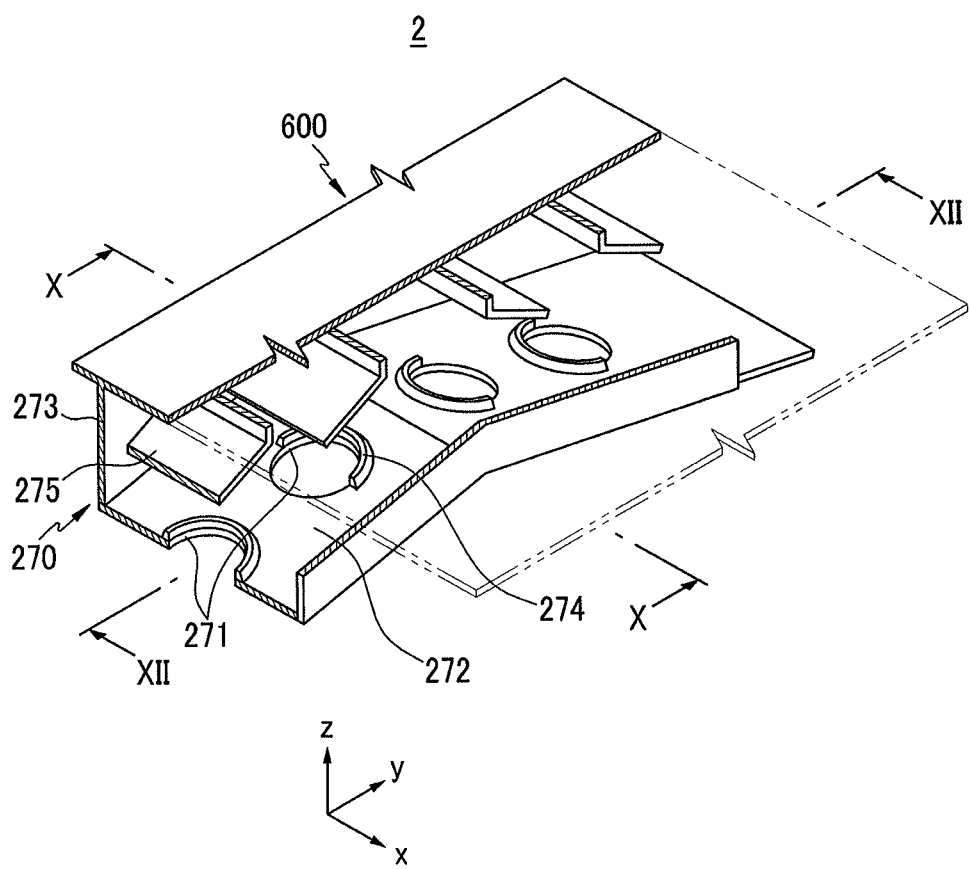
FIG. 9 illustrates a partially cutaway perspective view depicting a pack cover in a rechargeable battery pack according to another exemplary embodiment.
Figure 10:
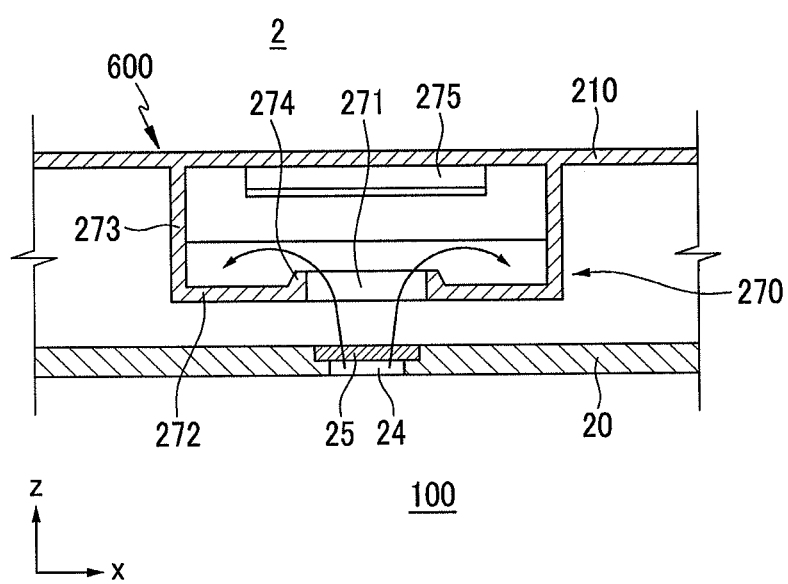
FIG. 10 illustrates a sectional view taken along line IX-IX of FIG. 9.

FIG. 9 illustrates a partially cutaway perspective view illustrating a pack cover a rechargeable battery pack according to the second exemplary embodiment, and FIG. 10 is a sectional view taken along line X-X of FIG. 9.

Referring to FIGS. 9 and 10, in a rechargeable battery pack 2 according to this exemplary embodiment, a discharge part 270 may include a bottom member 272 that inclines inside the pack cover 600 in an upward direction with respect to the cap plate 20 and in which an outlet 271 is formed, a sidewall member 273 connecting both sides of the bottom member 272 to an inner surface of the pack cover 600, and an inclined upper member 275 connected to an inner surface of the pack cover 600 at an upper side of the outlet 271.

The bottom member 272 and the sidewall member 273 may extend in a direction (y axis direction) in which a plurality of unit cells 100 is disposed. Accordingly, a discharge material together with gas discharged to the outlet 271 may collide with the upper member 275 and may fall onto the bottom member 272 inside the sidewall 273 to be discharged to both sides along the bottom member 272.

Figure 11:
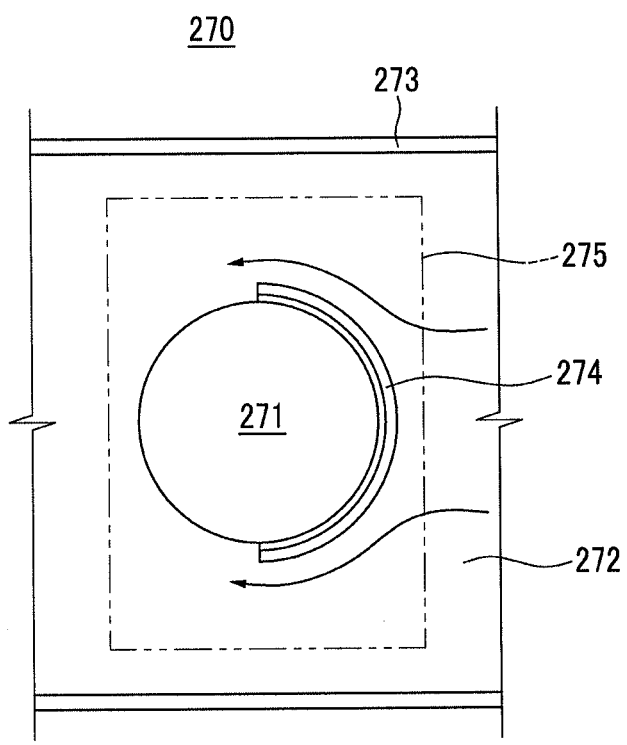
FIG. 11 illustrates a plan view depicting an outlet.
Figure 12:
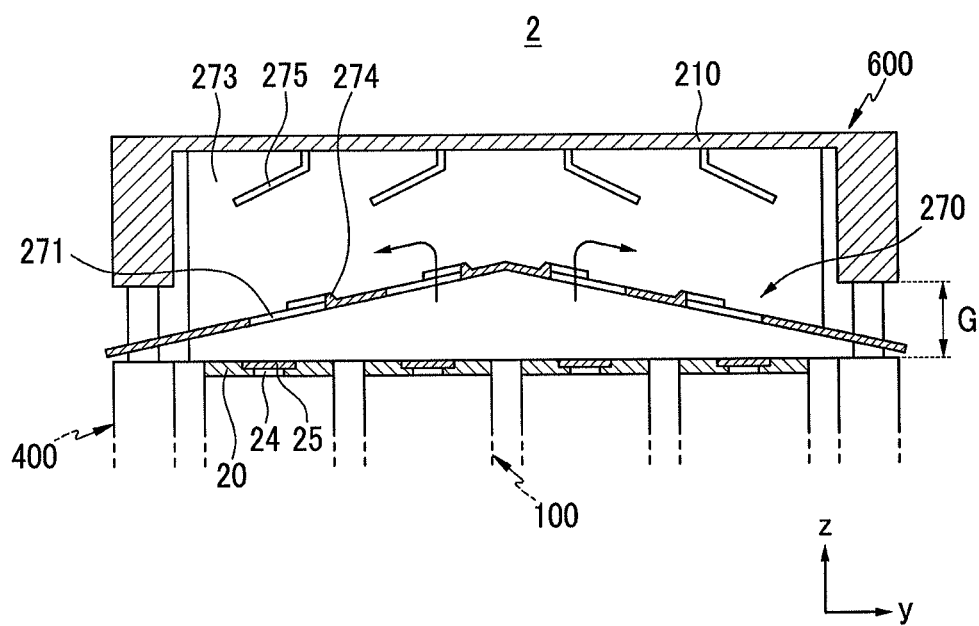
FIG. 12 illustrates a sectional view taken along line XII-XII of FIG. 9.

FIG. 11 illustrates a plan view illustrating an outlet, and FIG. 12 is a sectional view taken along line XII-XII of FIG. 9. Referring to FIGS. 11 and 12, the bottom member 272 further includes a lip 274 formed at an upper portion and a lateral side of an outlet 271 in an inclined direction.

The lip 274 has a vertical surface connected to the outlet 271, and an inclined surface connected to the bottom member in a upper end of the vertical surface, from the perspective of a section vertically cutting the bottom member 272. Accordingly, discharge material discharged from the outlet 271 may be induced to an outer peripheral portion of the outlet 271 by the lip 274 and may be discharged outward of the housing 400 along the bottom member 272.

In addition, the lip 274 may be formed to surround the outer peripheral portion of the outlet 271.

Also, a length of a circumference of the lip 274 may be the same as a length of a circumference of the outlet 271, or the length of the circumference of the lip may be over a half of the length of the circumference of the outlet 271.

The discharged material may be effectively blocked by the lip 274 surrounding the outlet 271, such that the discharged material does not flow backward into the outlet 271.

An inclined bottom end of the upper member 275 may be disposed in an upper vertical direction between the bottom member 272 and the outlet 271. Accordingly, the discharge material colliding with the upper member does not fall so as to be introduced back into the outlet 271, but instead, may fall onto the bottom member 272 outside the outlet 271 to be discharged outward of the housing 400.

In a rechargeable battery pack 2 according to this exemplary embodiment, through an operation of the external short-circuit part 40 and an operation of the vent plate 25, the gas that may erupt outwardly from the cap plate 20 from inside the unit cell 100 may be discharged outwardly from the battery pack 2 through the discharge part 270.

A discharge material (e.g., electrolyte solution) that may be discharged together with gas may be induced to the bottom member 272 through the outlet 271 to be discharged through the gap G. Accordingly, secondary pollution of the unit cell 100 by the discharge material discharged from the unit cell 100 may be reduced or prevented.

By way of summation and review, in a rechargeable battery pack, a pack cover may cover upper portions of the unit cells to protect the unit cells from external foreign substances or to block electrical short-circuit.

However, the pack cover may close and seal the cap plate parts of the unit cells to limit the discharge of gas and erupting material that may erupt through a cap plate. One unit cell that discharges material may secondarily contaminate adjacent unit cells.

In contrast, embodiments provide a rechargeable battery pack having advantages of stably discharging gas and an erupting material that may erupt from a unit cell by providing a discharge part in a pack cover. The discharge part is provided at the pack cover covering the unit cell. Accordingly, gas and an erupting material that may erupt from the unit cell can be discharged to the discharge part. An outlet is formed in the inclined bottom member of the discharge part. Accordingly, gas and an erupting material that may erupt from the unit cell pass through the outlet to be discharged through the bottom member.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, including:
    at least one unit cell with a top end, the at least one unit cell including a vent hole, and the at least one unit cell including a plurality of unit cells;
    a pack cover over the top end of the unit cell, the pack cover including a discharge part having a bottom member that is sloped with respect to the top end of the unit cell, the bottom member of the pack cover including an aperture corresponding to the vent hole of the unit cell; and
    a housing receiving the plurality of unit cells,
    wherein the bottom member includes:
        a first portion that is spaced apart from the top end of the unit cell in a direction oriented away from the unit cell, and
        a second portion extending from the first portion beyond an outermost edge of the pack cover outward of the housing, the second portion becoming lower relative to the first portion as a distance from the first portion increases, and
    wherein the bottom member is inclined to have a greatest distance from the top end of one of the unit cells at a center of the plurality of unit cells in a first direction.

2. The battery pack as claimed in claim 1, wherein the vent hole of the unit cell is sealed by a vent plate, the vent plate being openable in response to a predetermined internal pressure being exceeded in the unit cell.

3. The battery pack as claimed in claim 2, wherein the vent hole and vent plate are at the top end of the unit cell.

4. The battery pack as claimed in claim 1, wherein the bottom member is spaced from the vent hole.

5. The battery pack as claimed in claim 1, wherein the aperture provides fluid communication between the vent hole and the discharge part.

6. The battery pack as claimed in claim 1, wherein the pack cover is spaced apart from the top end of the unit cell.

7. The battery pack as claimed in claim 1, wherein the aperture includes a plurality of apertures, each of the apertures corresponding to the vent hole of a respective one of the unit cells.

8. The battery pack as claimed in claim 7, wherein:
    the second portion gradually and continuously becoming lower relative to the first portion from the center of the plurality of unit cells to the outermost edge of the pack cover.

9. The battery pack as claimed in claim 7, wherein:
    the pack cover further includes a flat plate covering the discharge part and a sidewall extending in a first direction, the sidewall connecting the flat plate and the bottom member.

10. The battery pack as claimed in claim 9, wherein, the discharge part further includes a cell barrier member extending from the bottom member and extending in the first direction between the apertures and the sidewall, the cell barrier member being spaced apart from the flat plate such that a fluid flow path is between the cell barrier member and the sidewall, the fluid flow path being in fluid communication with the apertures.

11. The battery pack as claimed in claim 9, wherein the pack cover further includes a lateral plate at respective ends of the pack cover in the first direction, the lateral plate being spaced apart from the housing by a gap.

12. The battery pack as claimed in claim 11, wherein the bottom member extends into the gap such that a fluid exit path is provided in the gap between the bottom member and the lateral plate.

13. The battery pack as claimed in claim 9, wherein each of the apertures is partially surrounded by a lip in an upper portion at a lateral side of the apertures in a sloping direction, the lip surrounding at least half of a circumference of each aperture.

14. The battery pack as claimed in claim 13, wherein the pack cover further includes an upper member connected to an inner surface of the flat plate and extending in a direction toward the bottom member.

15. The battery pack as claimed in claim 14, wherein the upper member is positioned to correspond in a vertical direction to a space between adjacent apertures.

16. The battery pack as claimed in claim 15, wherein the upper member includes a bottom end.

17. The battery pack as claimed in claim 7,
    wherein the housing is connected to the pack cover by coupling members, and
    wherein a cross-section of the bottom member has a shape of a single inverted "V", as viewed from a side view, the single inverted "V" covering simultaneously the plurality of unit cells.

18. The battery pack as claimed in claim 17, wherein the coupling members include coupling protrusions that engage the housing and the pack cover and separation parts that maintain a separation between the pack cover and the housing.

19. The battery pack as claimed in claim 18, wherein the pack cover and the housing include coupling holes that receive the coupling protrusions.

20. The battery pack as claimed in claim 19, wherein the coupling holes are at corners of the housing and the pack cover.

* * * * *